Aug. 19, 1924. Re. 15,897
G. A. CLEMENT
BIFOCAL LENS BLANK
Original Filed April 9, 1923
Fig. 1.
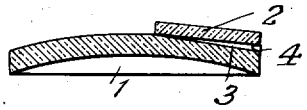
Fig. 2.
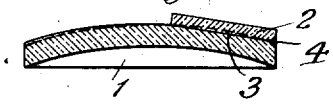
Fig. 3.
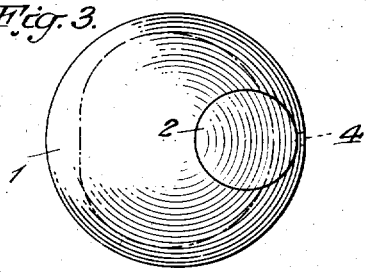
Fig. 4.
| No's | N. D. | PLANO C.X. | ADDS |
|---|---|---|---|
| 1 | 1.5665 | 12.00D | +1.00 |
| 2 | 1.5753 | 10.00D | +1.00 |
| 3 | 1.5884 | 8.00D | +1.00 |
| 4 | 1.6102 | 6.00D | +1.00 |
| 5 | 1.6537 | 4.00D | +1.00 |
| 6 | 1.6973 | 3.00D | +1.00 |
| 7 | 1.7845 | 2.00D | +1.00 |
Fig. 5.
| ADDITION | | | | | | | | | | | | | | | | |
|---|---|---|---|---|---|---|---|---|---|---|---|---|---|---|---|---|
| .25 | .50 | .75 | 1.00 | 1.25 | 1.50 | 1.75 | 2.00 | 2.25 | 2.50 | 2.75 | 3.00 | 3.25 | 3.50 | 3.75 | 4.00 | 4.50 |
| F C | F C | F C | F C | F C | F C | F C | F C | F C | F C | F C | F C | F C | F C | F C | F C | F C |
| 1+3.00 | 1+6.00 | 1+9.00 | 1+12.00 | | | | | | | | | | | | | |
| 2+2.50 | 2+5.00 | 2+7.50 | 2+10.00 | 2+12.50 | | | | | | | | | | | | |
| | 3+4.00 | 3+6.00 | 3+8.00 | 3+10.00 | 3+12.00 | | | | | | | | | | | |
| | 4+3.00 | 4+4.50 | 4+6.00 | 4+7.50 | 4+9.00 | 4+10.50 | 4+12.00 | | | | | | | | | |
| | | | 5+4.00 | 5+5.00 | 5+6.00 | 5+7.00 | 5+8.00 | 5+9.00 | 5+10.00 | 5+11.00 | 5+12.00 | | | | | |
| | | | 6+3.00 | 6+3.75 | 6+4.50 | 6+5.25 | 6+6.00 | 6+6.75 | 6+7.50 | 6+8.25 | 6+9.00 | 6+9.75 | 6+10.50 | 6+11.25 | 6+12.00 | |
| | | | 7+2.00 | 7+2.50 | 7+3.00 | 7+3.50 | 7+4.00 | 7+4.50 | 7+5.00 | 7+5.50 | 7+6.00 | 7+6.50 | 7+7.00 | 7+7.50 | 7+8.00 | 7+9.00 |
| ADDITION | | | | | | | | | | | | | | |
|---|---|---|---|---|---|---|---|---|---|---|---|---|---|---|
| .50 | .75 | 1.00 | 1.25 | 1.50 | 1.75 | 2.00 | 2.25 | 2.50 | 2.75 | 3.00 | 3.25 | 3.50 | 3.75 | 4.00 |
| F C | F C | F C | F C | F C | F C | F C | F C | F C | F C | F C | F C | F C | F C | F C |
| 4+3.00 | 4+4.50 | 4+6.00 | 4+7.50 | 4+9.00 | 4+10.50 | 4+12.00 | | | | | | | | |
| 5+2.00 | 5+3.00 | 5+4.00 | 5+5.00 | 5+6.00 | 5+7.00 | 5+8.00 | 5+9.00 | 5+10.00 | 5+11.00 | 5+12.00 | | | | |
| | 6+2.25 | 6+3.00 | 6+3.75 | 6+4.50 | 6+5.25 | 6+6.00 | 6+6.75 | 6+7.50 | 6+8.25 | 6+9.00 | 6+9.75 | 6+10.50 | 6+11.25 | 6+12.00 |
Fig. 6.
INVENTOR.
GEORGE A. CLEMENT
BY
Stockbridge & Borst
ATTORNEYS Reissued Aug. 19, 1924. Re. 15,897

UNITED STATES PATENT OFFICE.

GEORGE A. CLEMENT, OF MOUNT VERNON, NEW YORK, ASSIGNOR TO GENERAL OPTICAL COMPANY, A CORPORATION OF NEW YORK.

BIFOCAL-LENS BLANK.

Original No. 1,494,889, dated May 20, 1924, Serial No. 630,880, filed April 9, 1923. Application for reissue filed June 27, 1924. Serial No. 722,876.

*To all whom it may concern:*

Be it known that I, GEORGE A. CLEMENT, a citizen of the United States, residing at Mount Vernon, in the county of Westchester and State of New York, have invented certain new and useful Improvements in Bifocal-Lens Blanks, of which the following is a full, clear, and exact description.

In the manufacture of blanks from which fused bifocal lenses are produced, the practice is to grind and polish a recess or depression in one face of a major portion or piece of glass near one edge thereof, and seat therein a smaller piece of glass, known in the trade as a button, having its under surface properly shaped and prepared to unite with that of the recess and having an index of refraction greater than that of the major piece. In meniscus lenses the recess or depression is in the outer or convex face. The two pieces of glass are then subjected to heat until they unite by fusion forming one integral lens blank, and the finished lens is made by grinding and polishing the two faces of the blank to the proper curvatures according to the desired lenticular and cylindrical powers. While the curvature of the bifocal side is uniform throughout its entire area, the focal distance through the segment or area occupied by the button, which constitutes the reading segment or field, is shorter than that through the rest of the lens which constitutes the distance field, because of the difference in refractive index through the two fields. This result is obtained, for example, by making the major portion of crown glass and the button of flint glass.

Since the power of a lens depends upon the curvature of its faces and its index of refraction, it follows that the added power through the reading field depends both upon the curvature of the recess or depression, i. e., the curvature on the inner face of the button, and the curvature of the outer or bifocal face of the major lens, which curvature is also common to the reading segment. According to present standard practice the curvature of the depression varies in a complete stock of fused bifocal lens blanks from a maximum concavity for the highest addition to a plane or substantially plane surface, the refractive index of the flint glass buttons being constant throughout the entire range. In rare cases where the added power called for by a prescription is very high the manufacturer may make a special pair of blanks using a flint glass of higher index of refraction in order to reduce the concavity and hence the thickness of the lenses, but this is only resorted to in special cases and requires the services of a specialist to determine the curves which it is necessary to grind to get the desired added powers.

In the standard practice the meniscus or toric blanks are put out in a number of so-called base curves in order to minimize the work of the lens grinder in reducing the surfaces of the blanks to the desired curvatures. The outer or convex face of the blank may be finished to any curvature within the range of the tools of the lens grinder, and the lens grinder will select a blank having a base curve nearest to that of the finished surface. It is manifest, however, that with a given blank the added power through the reading field will depend upon the final curve of the convex face, since this determines the outside curve of the minor lens. Therefore in order to obtain a desired addition, as this added power is commonly called, the inside curve of the flint glass button must vary with the curve on the outer face. This makes necessary a great number of curvatures for the recess or inside face of the button for each base curve, in order that the dispenser may be able to fill any ordinary prescription, and requires him to carry a large number of blanks in stock and makes his initial investment considerable.

My invention very largely reduces the number of blanks in a complete set capable of satisfying the ordinary prescriptions. Briefly stated, it contemplates a set of fused bifocal lens blanks in which the geometrical surface of the recess is constant. This has many advantages, some of which will presently be pointed out, and I have determined by calculation and test that the refractive index of the flint glass used for the buttons may be so varied as to provide the requisite range of additions without modifying the inside curve of the buttons, and at the same time permitting the grinder to use the present standard surfacing tools.

By way of illustration I shall explain my invention as it will be employed so that the two surfaces which are united by fusing are plano. The advantages in fusing two plano surfaces together as compared with the fusing of two spherical surfaces will be appreciated by those skilled in the art. In the present practice in which the contacting surface of the button is convex, it is ground to a greater curve than is the recess and is seated in the recess and held in contact at one point at the initiation of the fusing operation. The button is then heated until it gradually drops down from the point of contact outwardly and coalesces with the wall of the depression, this method being employed to exclude all air and evolved gases from between the two surfaces. For this purpose the fusing temperature required is so great that the glass at the surfaces is caused to deteriorate and the contact surfaces are frequently distorted. This is entirely eliminated in the fusing of two plano surfaces together since a considerably lower temperature is required therefor and it is unnecessary to heat the glass to such a degree as to effect it deleteriously.

Another decided advantage in a set of blanks in which the countersink or recess is practically eliminated, irrespective of the addition, is the fact that the finished lenses may be thinner and correspondingly lighter, since they enable the lens grinder to grind the concave face of lenses of high addition as far down as that of lenses of the lowest addition.

Another feature of my invention is the fact that it reduces the chromatic aberration of the reading field for the higher additions as compared with the present type in which flint glass of the same index of refraction and with its relatively high dispersion is used for both the high and low additions.

Still another advantage of the set of blanks comprehended by my invention is the fact that the cost of manufacture is materially reduced. For example with the plano interfaces the crown discs may be much more expeditiously prepared to receive the buttons than is the case where the countersinks are spherical; they are more easily blocked up and many more may be operated on at one time. And in any event it is evident that a considerable saving in time and grinding apparatus is effected by having all of the interfaces the same geometrical surface, and that economy results from the saving of time and heat required for the fusing operation, and from the substantial reduction in the number of defective blanks.

Many other advantages in my invention than those above pointed out will appear to those skilled in the art. I shall now explain one way in which my invention may be reduced to practice and will thereafter point out my invention in claims.

Fig. 1 is a sectional elevation of the two parts of a blank assembled ready for fusing;

Fig. 2 is a similar view of the blank after fusing;

Fig. 3 is a plan of the blank after its bifocal side has been surfaced down to the desired curvature, as indicated by the dotted line in Fig. 2;

Fig. 4 is a table of seven different flint glasses which may be employed in carrying out the invention, giving their indices of refraction on the D line together with the surface curvatures of lenses made from them which will be necessary to effect an addition of one diopter;

Fig. 5 is a chart illustrative of the use of the seven flint glasses in conjunction with a major lens of crown glass of refractive index 1.523, and showing the numbers of the flint glasses and the surface curvatures which will provide the customary additions; and Fig. 6 is a chart similar to that of Fig. 5 except that it is limited to three different flint glasses of the seven tabulated in Fig. 4.

Figs. 1, 2 and 3 show a rough major blank 1 of crown glass and a button 2 of flint glass. A small portion 3 of the convex face of the major blank has been ground and polished off to a plane surface. The button 2 is a plane disc, the under face of which is ground and polished to a plane surface. Preferably the two parts will be placed in a furnace in the relation illustrated in Fig. 1, with a small insert or wedge 4 underneath the lower edge of the button so as to hold it in tilted relation with its upper edge resting at one point upon the surface of the crown glass blank. Under the influence of the heat the flint glass button becomes plastic and drops down so as to conform to and coalesce with the surface of the crown glass, as shown in Fig. 2. In producing the finished lens from this fused blank, the top surface is ground off to the desired curvature so as to include a sufficient portion of the flint glass button, for example as illustrated by the dotted line in Fig. 2. The under face of the blank is then ground according to prescription, and the finished lens is cut out to the desired shape, for instance as indicated in the dotted outline in Fig. 3. It is evident that the added power through the reading segment depends upon the index of refraction on the flint glass and upon the curvature of the outer face of the lens, since the lower face of the button is plano.

I have determined that if the seven flint glasses tabulated in Fig. 4 are ground plano-convex with the convex curvatures indicated in the third column of Fig. 4, they will all add one diopter in lenticular power when used in conjunction with a major blank of crown glass having an index of refraction of 1.523. In other words, if a blank is made similar to that illustrated in Figs. 1, 2 and 3 with the button 2 made of #1 flint glass with an index of refraction on the D line of 1.5665, the addition through the reading field will be one diopter if the convex face is ground to a curvature of twelve diopters. From this it follows that if the convex face of the blank be ground to six diopters, the added power will be .50 diopters, and other additions may be similarly computed.

From the table of Fig. 4 it follows that if the button 2 be made of #2 flint glass having an index of refraction of 1,5753, the addition will be one diopter if the curvature of the outer face of the blank be ten diopters. If the button be made of #3 flint glass having an index of refraction 1.5884, the addition will be one diopter if the outer face be ground to eight diopters. If the button be #4 flint glass with an index of refraction of 1.6102, the addition will be one diopter if the curvature on the outer face be six diopters. If the button be made of #5 flint glass having an index of refraction of 1.6537, the addition will be one diopter if the curvature of the outer face of the blank be four diopters. If the button be made of #6 flint glass having an index of refraction 1.6973, the addition will be one diopter if the curvature of the outer face be three diopters. If the button be composed of #7 flint glass having an index of refraction 1.7845, the addition will be one diopter if the curvature of the outer face of the blank be two diopters.

In the chart of Fig. 5 there is indicated the curvature of the outer face and the number of flint glass which would serve to produce additions from .25 to 4.50. It will be understood that all the possible combinations are not therein illustrated, but only such as might easily and reasonably be employed. In the first column is shown one combination which will produce an addition of .25 diopters. This is #1 flint glass with a curvature of three diopters, F standing for flint glass and C standing for curvature. If #1 flint glass adds one diopter with the curvature on the outer face of the blank of twelve diopters, it therefore follows that it will add .25 diopters if the outer curvature is three diopters. In the second column there are shown four combinations of flint glass and surface curvatures which will produce an addition of .50 diopters. These are the first four of the seven flint glasses with the curvatures just half of that indicated in the third column of Fig. 4. In the third column of Fig. 5 there are shown four combinations which will produce an addition of 75, these being the first four numbers of flint glass with the curvatures three quarters of the respective numbers appearing in the third column of Fig. 4; and so it will be seen that the successive columns are simply the result of mathematical computation until the highest addition, 4.50 diopters, is reached. It will be seen that the curvature of #7 flint glass in order to produce this addition will need to have 4½ times the curvature which is set opposite it in Fig. 4; i. e., a curvature of nine diopters. Within this range of additions are included all of the ordinary prescriptions.

These blanks could be made on any base curve plan and are readily adaptable to the present three base curve plan, viz., three diopters, six diopters and nine diopters. This would give a maximum of twenty one numbers of blanks to satisfy all prescriptions, i. e., seven different numbers of flint glass of each of the base curves. As will readily be seen from an inspection of the chart of Fig. 5, all of these numbers would not be necessary.

The selecting of the proper blank for each addition will be a simple matter. For the .25 diopter addition, the blank selected would be that having #1 flint glass for the button and a base curve of three diopters. For the .50 diopter addition the grinder would select either a blank having a #1 flint glass and a six base curve, or one having a #2 flint glass on a three base curve, or a #3 on a three base curve, or a #4 on a three base curve, according to which one of the four possibilities indicated in the second column of Fig. 5 he concluded to employ. While he might select a six base curve blank for the second possibility, it is preferable to grind the surface two diopters stronger than the base curve rather than one diopter weaker. So with each addition the lens grinder by simply referring to this chart, can determine which blank to use. For example, in the column for 2.75 diopter addition, for the first possibility he would use a blank having #5 flint glass and a nine base curve. For the second possibility he would use a #6 flint glass on a nine base curve. For the third possibility he would use a #7 flint glass on a six base curve. In every instance the base curve selected would depend upon the curvature to be ground on the rear face in order to give the desired power through the major lens.

It will readily be appreciated that for the corrections which are ordinarily met with it is not necessary to use as many as the seven different indices of flint glass. In only exceptional cases do prescriptions call for additions below .50 diopter or above 4.00 diopters. For instance, as appears from the chart of Fig. 6, prescriptions within that range can be taken care of by a set of blanks the buttons of which are made from only numbers 4, 5 and 6 of the flint glass tabulated in Fig. 4. It will be observed that these combinations could be satisfied with only seven numbers of blanks, as follows: a #4 flint glass on a three base curve; a #4 flint glass on a six base curve; a #5 flint glass on a three base curve; a #5 flint glass on a six base curve; a #5 flint glass on a nine base curve; a #6 flint glass on a six base curve; and a #6 flint glass on a nine base curve.

While I have explained and illustrated my invention as adapted to plano interfaces between the two pieces of glass, it is evident that the principle of my invention is not limited to that particular geometrical form of surface, but that the surface as well as the indices of refraction of both the flint and crown glasses as above mentioned may be modified without departing from the scope of my invention as pointed out in the appended claims.

I claim:

1. A product of manufacture comprising a set of bifocal lens blanks formed by fusing a small piece of glass having a relatively high index of refraction to a major piece of glass of lower index of refraction, the set being made up of a plurality of series according to base curve and each series being made up of a plurality of units according to the index of refraction of the small piece of glass, the index of the small piece of glass being different for each unit of a series but being the same for the corresponding units of the several series and the base curve being different for the several series but being the same for the units of each series.

2. A product of manufacture comprising a set of bifocal lens blanks formed by fusing a small piece of glass having a relatively high index of refraction to a major piece of glass of lower index of refraction, the blanks all having substantially the same geometrical surface between the two pieces of glass and the set being made up of a plurality of series according to base curve and each series being made up of a plurality of units according to the index of refraction of the small piece of glass, the index of the small piece of glass being different for each unit of a series but being the same for the corresponding units of the several series and the base curve being different for the several series but being the same for the units of each series.

3. A product of manufacture comprising a set of bifocal lens blanks formed by fusing a small piece of glass having a relatively high index of refraction to a major piece of glass of lower index of refraction, the blanks all having substantially a plane surface between the two pieces of glass and the set being made up of a plurality of series according to base curve and each series being made up of a plurality of units according to the index of refraction of the small piece of glass, the index of the small piece of glass being different for each unit of a series but being the same for the corresponding units of the several series and the base curve being different for the several series but being the same for the units of each series.

In witness whereof, I hereunto subscribe my signature.

GEORGE A. CLEMENT.